United States Patent
Pierre

(10) Patent No.: US 9,162,889 B2
(45) Date of Patent: Oct. 20, 2015

(54) HYDRAULIC DESALINATION DEVICE AND METHOD

(76) Inventor: Marvin W. Pierre, Virginia Beach, VA (US)

(*) Notice: Subject to any disclaimer, the term of this patent is extended or adjusted under 35 U.S.C. 154(b) by 374 days.

(21) Appl. No.: 13/434,516

(22) Filed: Mar. 29, 2012

(65) Prior Publication Data

US 2012/0294795 A1    Nov. 22, 2012

Related U.S. Application Data

(60) Provisional application No. 61/486,596, filed on May 16, 2011, provisional application No. 61/608,428, filed on Mar. 8, 2012, provisional application No. 61/613,728, filed on Mar. 21, 2012.

(51) Int. Cl.
*B01D 3/00* (2006.01)
*C01B 5/00* (2006.01)
*C02F 1/04* (2006.01)
(Continued)

(52) U.S. Cl.
CPC ... *C01B 5/00* (2013.01); *B01D 3/06* (2013.01); *B01D 3/106* (2013.01); *B01D 5/006* (2013.01); *B01D 5/0039* (2013.01); *C02F 1/048* (2013.01); *F04B 15/00* (2013.01); *C02F 2103/08* (2013.01); *Y10S 203/08* (2013.01); *Y10S 203/17* (2013.01)

(58) Field of Classification Search
CPC .......... C01B 5/00; B01D 1/0082; B01D 1/14; B01D 3/00; B01D 3/06; B01D 3/007; B01D 3/10; B01D 3/03; B01D 3/42; B01D 3/106; B01D 5/0039; B01D 5/006; B01D 5/0045; B01D 5/0051; F04B 15/00; F04B 11/0016; F04B 11/0025; F04B 11/0033; F04B 49/22225; C02F 1/04; C02F 1/048; C02F 2103/08; C02F 2209/00; F15B 2211/405; Y10S 159/40; Y10S 202/00; Y10S 203/08; Y10S 203/17; Y10S 203/18
See application file for complete search history.

(56) References Cited

U.S. PATENT DOCUMENTS 1,309,943 A * 7/1919 Humphrey et al. ......... 123/74 C
2,236,035 A * 3/1941 Luhrs .......................... 196/141
(Continued)

FOREIGN PATENT DOCUMENTS

CN    101955286    1/2011
CN    102046252    9/2014
(Continued)

OTHER PUBLICATIONS

Notification of Transmittal of the International Search Report and the Written Opinion of the International Searching Authority, or the Declaration; mailed on Oct. 23, 2012 for related PCT case PCT/US2012/031250.

*Primary Examiner* — Virginia Manoharan
(74) *Attorney, Agent, or Firm* — Stanzione & Associates, PLLC

(57) ABSTRACT

A hydraulic desalination system, device and method includes lowering the pressure of liquid saltwater to the vaporization point by generating flow through piping and accompanying infrastructure that may include valves that impart friction and control flow, capturing the vapor, condensing the vapor using higher pressure supplied by the ambient surroundings producing freshwater, recovering the heat released during condensation by maintaining ambient temperatures greater than vapor temperatures, and then using the recovered heat to enhance and perpetuate vaporization in a cyclical manner. A novel spring-loaded pump for pumping fluids may facilitate the process.

16 Claims, 11 Drawing Sheets

(51) Int. Cl.
  *F04B 15/00* (2006.01)
  *B01D 3/10* (2006.01)
  *B01D 3/06* (2006.01)
  *B01D 5/00* (2006.01)
  *C02F 103/08* (2006.01)

(56) References Cited

U.S. PATENT DOCUMENTS

| | | | | |
|---|---|---|---|---|
| 3,102,083 A | * | 8/1963 | Adams | 203/11 |
| 3,304,006 A | * | 2/1967 | Adams | 237/67 |
| 3,364,126 A | * | 1/1968 | Gutterman et al. | 203/11 |
| 3,440,146 A | | 4/1969 | Louw | |
| 3,783,108 A | | 1/1974 | Koivisto et al. | |
| 3,859,069 A | * | 1/1975 | Seliber | |
| 4,479,606 A | * | 10/1984 | Balz | 237/67 |
| 5,744,008 A | * | 4/1998 | Craven | 202/83 |
| 8,361,281 B2 | * | 1/2013 | Rock et al. | 203/10 |

FOREIGN PATENT DOCUMENTS

| | | |
|---|---|---|
| CN | 201280035178.9 | 11/2014 |
| DE | 102008013598 | 9/2009 |
| GB | 2456153 A * | 7/2009 |
| KR | 10-1997-0069882 | 11/1997 |
| KR | 097069882 | 11/1997 |
| KR | 20110030235 | 3/2011 |

* cited by examiner

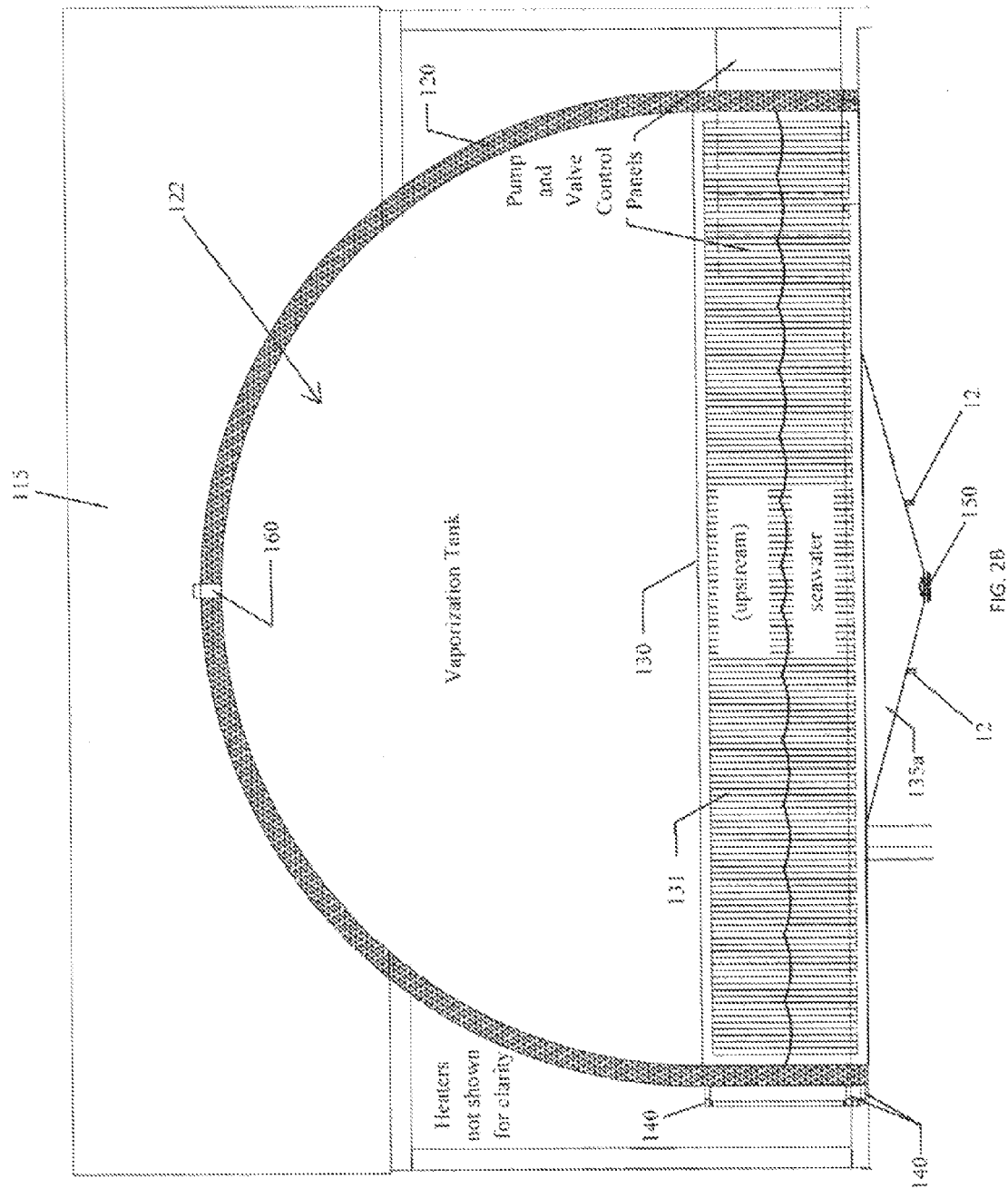

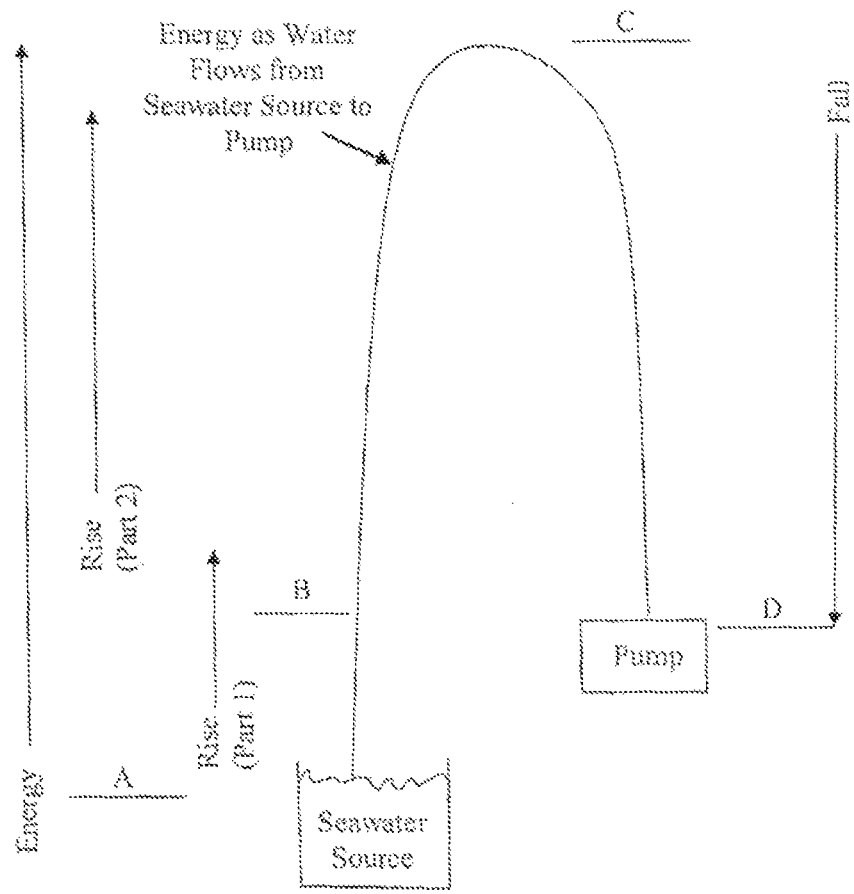

Rise (Part 1) = B − A;
Rise (Part 2) = C − B;
Fall = D − C;
Overall Difference = Rise (Part 1) + Rise (Part 2) + Fall;
Overall Difference = (B − A) + (C − B) + (D − C);
B = D;
Overall Difference = (B − A) + (C − B) + (B − C);
(C − B) + (B − C) = 0, so Rise (Part 2) is cancelled by Fall;
Rise (Part 2) represents evaporation, and Fall represents condensation, so evaporation is cancelled by condensation;
Overall Difference = D − A, which represents the TDH that needs to be provided by the pump during Hydraulic Desalination

FIG. 9

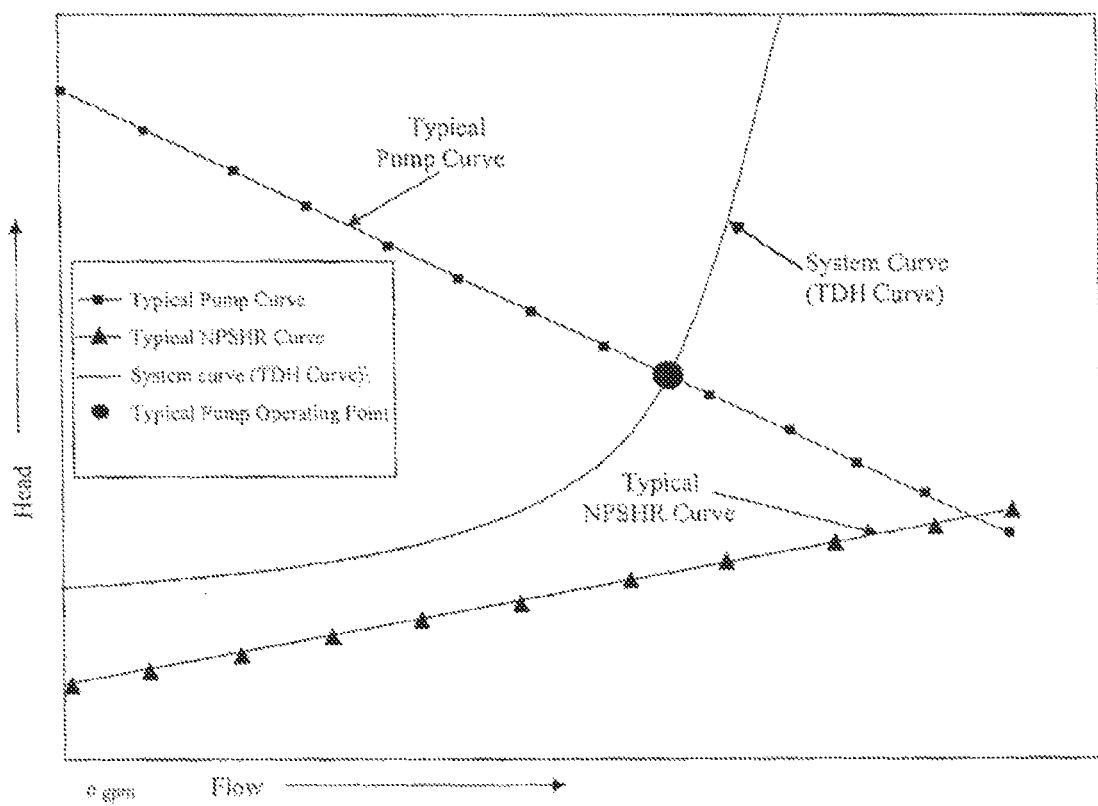
FIG. 6: Typical Pump and NPSHR Curves

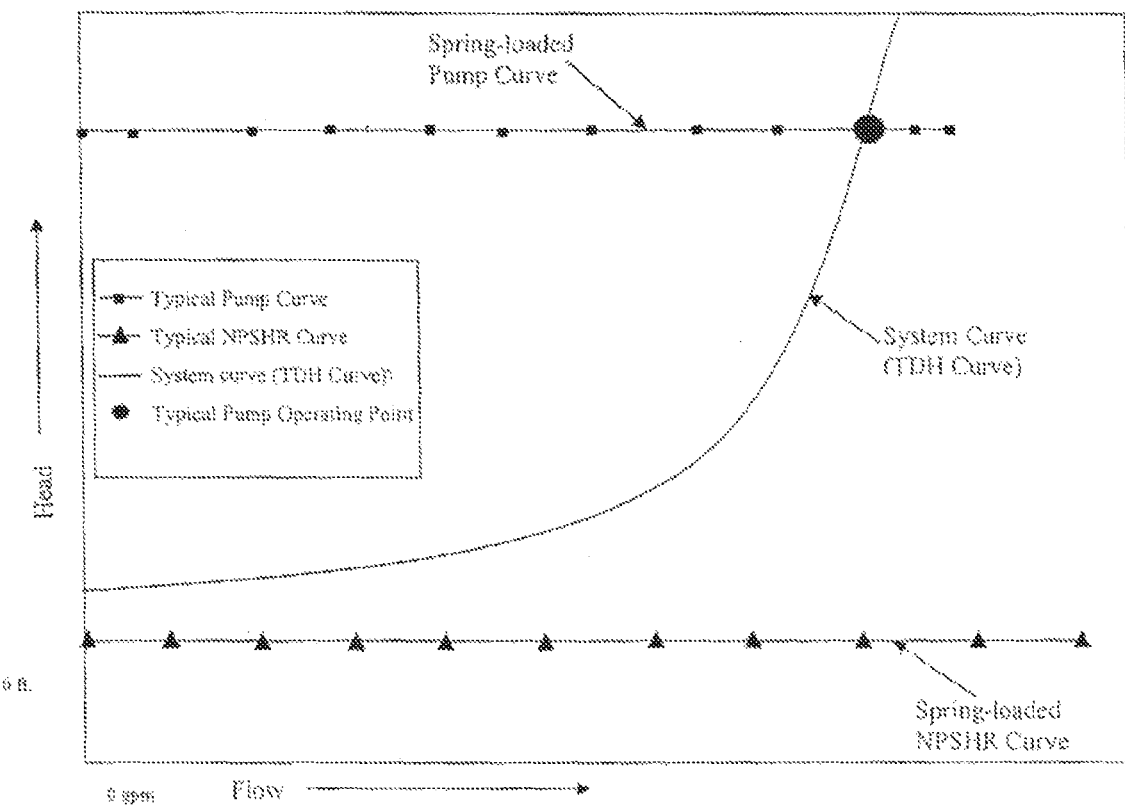
FIG. 7: Example Spring-Loaded Pump and NPSHR Curves

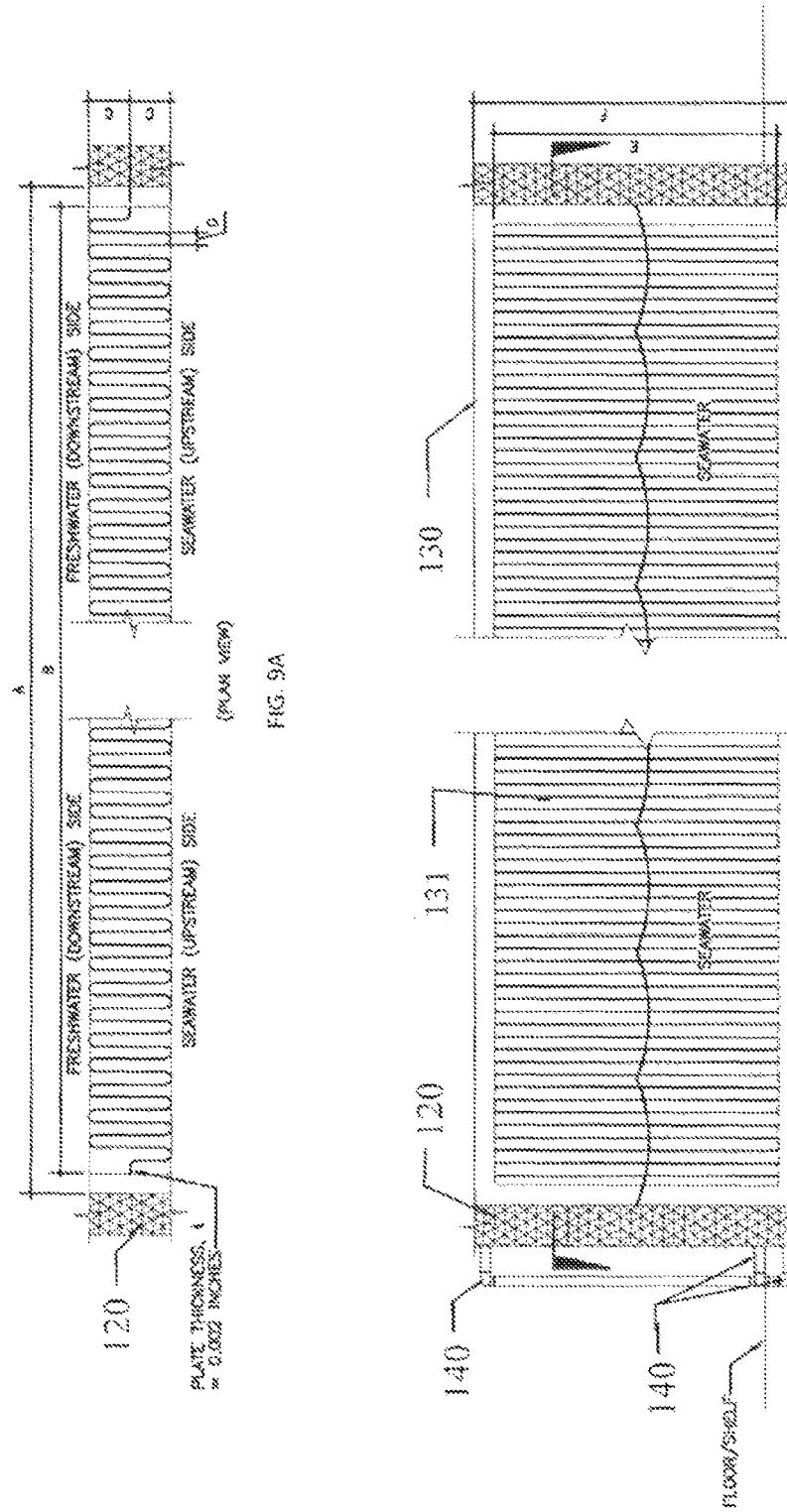

HYDRAULIC DESALINATION DEVICE AND METHOD

CROSS-REFERENCE TO RELATED APPLICATIONS

This application claims priority and benefit of U.S. Provisional Application No. 61/486,596, filed on May 16, 2011, and also claims priority and benefit of U.S. Provisional Application No. 61/608,428, filed on Mar. 8, 2012, and also claims priority and benefit of U.S. Provisional 61/613,728 filed on Mar. 21, 2012, the disclosures of which are incorporated by reference herein in their entirety.

BACKGROUND 1.0 Field of the Invention

The present invention relates to a desalination device and a method for desalinating salted water, such as for example, seawater.

2.0 Related Art

About 97% of the world's water is undrinkable seawater. The remaining 3% of water, freshwater, is the only water in the world that's naturally drinkable. As demand for freshwater increases along with the growing human population, the already precious resource will become even more valuable in the future. Over the years, processes for desalinating seawater have been developed in an effort to tap into that 97% of the world's water that surrounds us seemingly everywhere. So far, the processes have not reached a level of economic efficiency to promote widespread use for desalination. However, this could change if a new desalination process were developed that was so cost effective that it would rival the cost of finding and using freshwater, particularly when freshwater is distant or remote, or difficult to access.

Presently, in general, two basic types of technology are used for desalinating seawater. The first technology is called thermal desalination, and the second technology is called membrane process desalination. Almost all existing desalination processes can be categorized, ultimately, as either thermal or membrane-based. The primary problem with each technology is that it requires large amounts of energy to succeed. For thermal processes, large amounts of heat must be supplied to cause evaporation. Temperatures for these processes can reach 212 degrees Fahrenheit, or higher. For membrane-based processes, large amounts of pressure must be supplied to seawater to screen the dissolved salt out of the water. Pressures for these processes can reach 1,000 pounds per square inch (psi), or higher. Since ambient temperature and pressure are typically 72 degrees Fahrenheit and 14.7 psi, respectively, it becomes evident why so much energy needs to be brought into these systems. The ambient surroundings alone cannot support these processes. A new desalination process supported entirely by ambient temperature and pressure conditions appears to have an inherent advantage in that its energy requirements should be much lower than the energy requirements of other existing processes.

SUMMARY OF THE INVENTION

The present disclosure provides for advantages over traditional desalination systems and processes as discussed above and addresses their shortcomings, while doing so economically. In one aspect, the present disclosure provides for a hydraulic desalination system, device and method that includes lowering the pressure of liquid saltwater to the vaporization point by generating flow through piping and accompanying infrastructure that may include valves that impart friction and control flow, capturing the vapor, condensing the vapor using higher pressure supplied by the ambient surroundings to produce freshwater, injecting air, recovering the heat released during condensation by maintaining ambient temperatures greater than vapor temperatures, and then using the recovered heat to enhance and perpetuate vaporization in a cyclical manner. The system may employ a spring-loaded pump that may be configured to pump the saltwater and freshwater simultaneously.

In one aspect, a method for desalination of water is provided. The method may include the steps of vaporizing liquid saltwater by lowering the pressure of liquid saltwater to a vaporization point by generating saltwater flow through piping and accompanying infrastructure to produce vapor, capturing the vapor, condensing the vapor to produce freshwater using higher pressure supplied by ambient surroundings, recovering heat released during the condensation step by maintaining ambient temperatures greater than vapor temperatures and using the recovered heat to enhance and continue vaporization of the saltwater in a cyclical manner.

In one aspect, a system for desalination of saltwater includes a containment vessel configured to substantially enclose an upstream containment section and a downstream containment section, a pump system for pumping both saltwater from a saltwater source into the upstream containment section and for pumping condensed freshwater from the downstream containment section, wherein the pump system comprises a plurality of spring-loaded pumps configured to pump the saltwater and the freshwater simultaneously, at least one friction valve that controls friction imparted to a flow of saltwater on the suction side of a plurality of spring-loaded pumps to lower pressure of the saltwater to the vaporization point causing vaporization of the saltwater within the containment vessel to produce water vapor and an air source configured to inject air into the containment vessel to force condensation of the water vapor into the downstream containment section thereby desalinating the saltwater producing freshwater.

BRIEF DESCRIPTION OF THE DRAWINGS

The accompanying drawings, which are included to provide a further understanding of the invention, are incorporated in and constitute a part of this specification, illustrate examples of the invention and together with the detailed description serve to explain the various principles of the present disclosure. No attempt is made to show structural details of the invention in more detail than may be necessary for a fundamental understanding of the invention and the various ways in which it may be practiced.

FIG. 2B shows another detailed cross-sectional view of certain components that may be included in the configuration of the hydraulic desalination system of FIGS. 1A and 1B;

FIG. 5 shows an example of thermodynamic siphon created by the system and method as configured and performed according to the principles of the invention;

FIG. 6 shows an example of a pump curve and a Net Positive Suction Head Required curve for a typical non-hydraulic desalination pump;

FIG. 7 shows an example of a pump curve and a Net Positive Suction Head Required curve for a hydraulic desalination pump constructed according the principles of the invention;

FIG. 9A shows a top-down view of an example heat exchanger device, configured according to the principles of the invention; and FIG. 9B shows a side cross-sectional view of the heat exchanger device shown in FIG. 9A.

DETAILED DESCRIPTION OF THE INVENTION

Figure 1A:
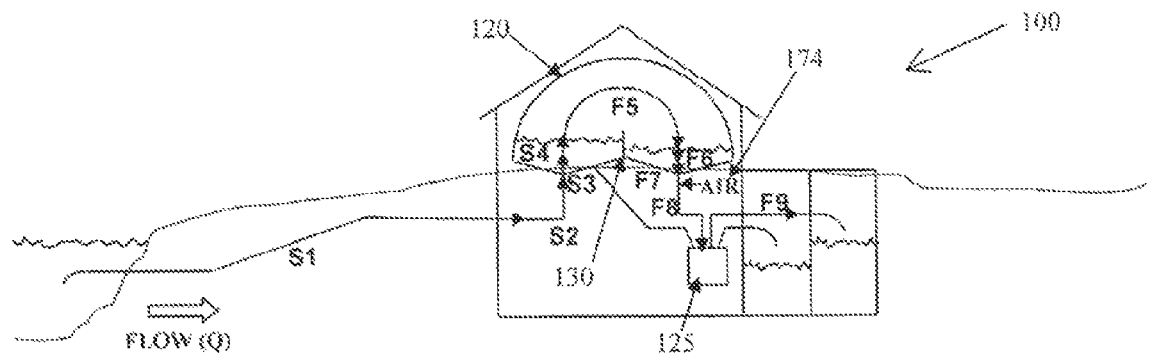
FIG. 1A shows an example of a saltwater to freshwater component of a hydraulic desalination system, configured according to the principles of the invention, and also shows a simplified process of the overall progression of seawater to freshwater, according to principles of the invention.

The various aspects and principles of the present invention and advantageous details thereof are explained more fully with reference to the non-limiting examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the various aspects of the invention. The examples used herein are intended merely to facilitate an understanding of ways in which the invention may be practiced and to further enable those of skill in the art to practice the various embodiments of the invention. Accordingly, the embodiments herein should not be construed as limiting the scope of the invention, which is defined solely by the appended claims and applicable law. Moreover, it is noted that like reference numerals represent similar parts throughout the several views of the drawings.

FIG. 1A shows an example of a saltwater to freshwater component of a hydraulic desalination system, configured according to the principles of the invention, generally denoted by reference numeral 100, and also shows a simplified process of the overall progression of seawater to freshwater, according to principles of the invention.

Figure 1B:
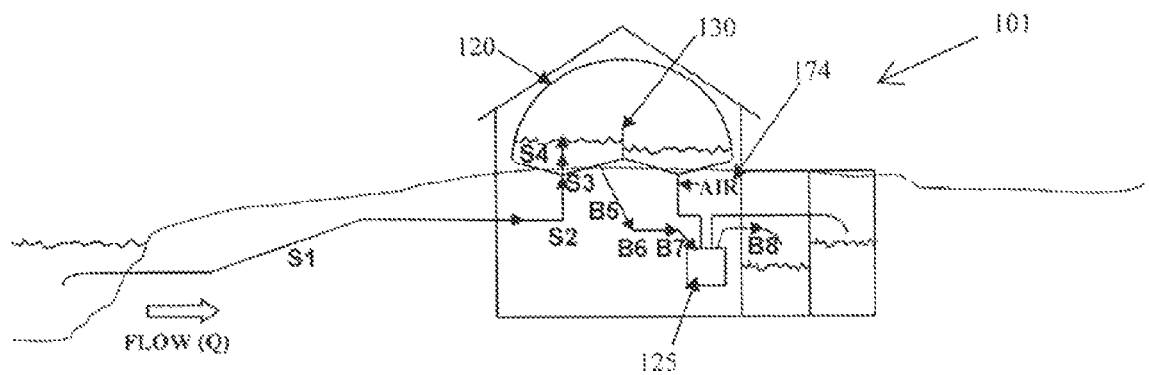
FIG. 1B shows an example of a saltwater to brine water component of the hydraulic desalination system, configured according to the principles of the invention, and also shows a simplified process of the overall progression of seawater to brine, according to principles of the invention.

FIG. 1B shows an example of a saltwater to brine water component of the hydraulic desalination system, configured according to the principles of the invention, generally denoted by reference numeral 101, and also shows a simplified process of the overall progression of seawater to brine, according to principles of the invention.

As shown in relation to FIGS. 1A and 1B, a generalized exemplary hydraulic desalination device and method include lowering the pressure of liquid saltwater to the vaporization point by generating flow through piping and accompanying infrastructure, capturing the vapor, condensing the vapor using higher pressure supplied by the ambient surroundings producing freshwater, recovering the heat released during condensation by maintaining ambient temperatures greater than vapor temperatures, and then using the recovered heat to enhance and perpetuate vaporization in a cyclical manner.

As described in more detail below, FIGS. 1A and 1B show an example of a pump station that houses a water vaporization tank 120 that comprises a containment vessel, a pump system 125 for pumping water, including saltwater and freshwater through the desalination system 100, and a plurality of funnels separated by a partition 130. The FIGS. 1A and 1B show an example of the pump station infrastructure in relation to ground elevation and a saltwater source. An air nozzle 174 is also shown configured to inject air into the freshwater side. FIG. 1A illustrates more clearly the saltwater to freshwater aspects, while FIG. 1B illustrates more clearly the saltwater to brine aspects.

FIG. 1A also shows a simplified process of the overall progression of seawater to freshwater, while FIG. 1B also shows a simplified process of the overall progression of seawater to brine, according to principles of the invention. These generalized steps of FIGS. 1A and 1B are explained in more detail below, in reference to other drawings.

Figure 2A:
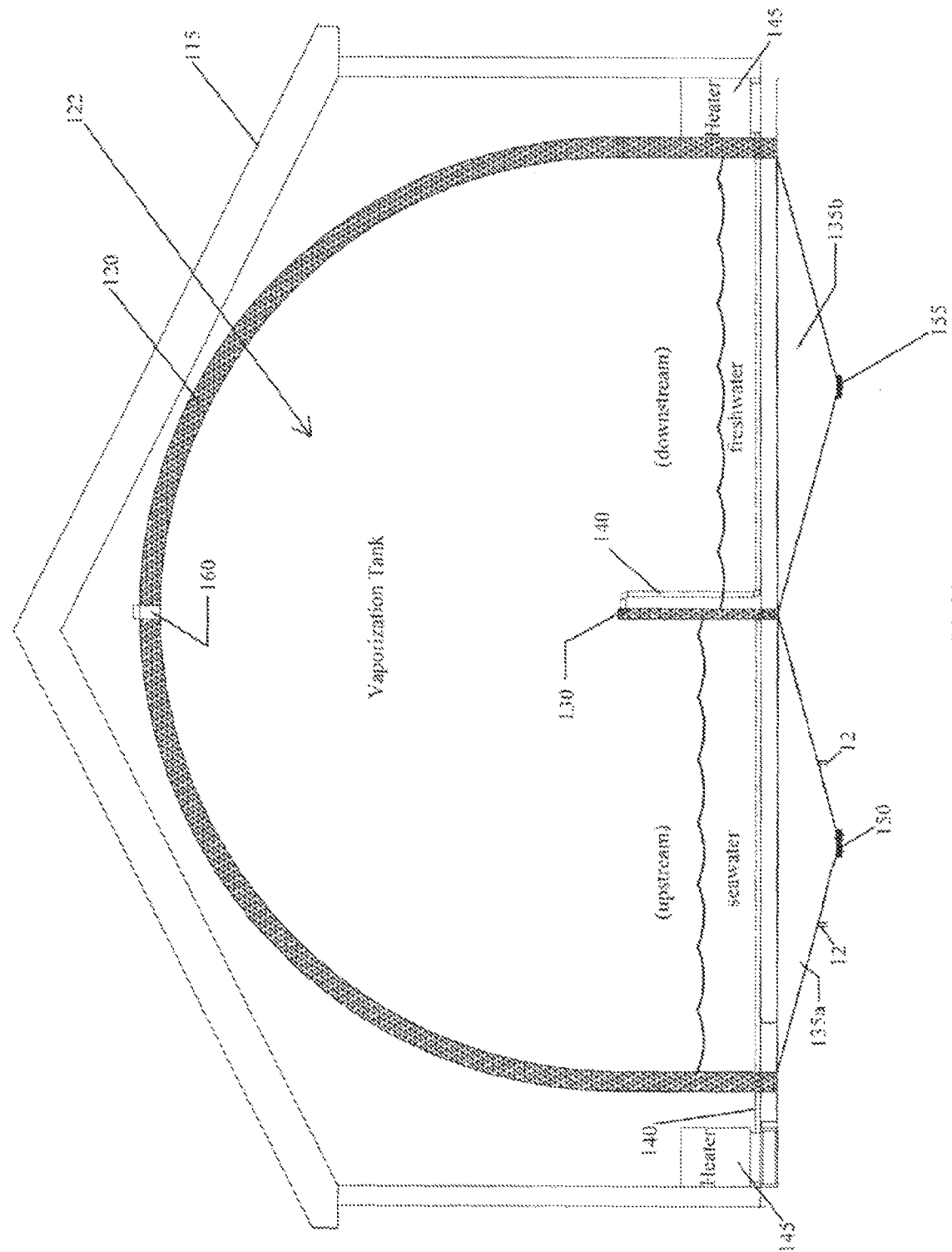
FIG. 2A shows a more detailed cross-sectional view of certain components that may be included in the configuration of the hydraulic desalination system of FIGS. 1A and 1B.

Referring to FIG. 1A, step S1 illustrates a force main for conveying a flow of seawater from a source such as an ocean, or the like, to a desalination system 100. At step S2 seawater may encounter force main friction valves. At step S3, the seawater flows into a funnel 135b (FIG. 2A). At step S4, the seawater may be contained by a partition 130 in a water vaporization tank 120 to create an upstream containment section. At step F5, the seawater may vaporize, as described in more detail below, to create a vapor portion within the vaporization tank 120. At step F6, the vapor portion may condense within the water vaporization tank 120 and may be captured as liquid freshwater creating a downstream containment section. At step F7 the downstream containment section may be contained by a funnel 135b in conjunction with partition 130. At step F8, the freshwater may traverse suction piping with friction valves, e.g., set friction valves. The freshwater may include about 2% injected air. At step F9, the freshwater may enter pumps (e.g., 165a-165e of FIGS. 3A and 3B), and may be discharged to a freshwater storage area.

Referring to FIG. 1B, steps S1 to S4 are the same as described previously in reference to FIG. 1A. At step B5, brine that collects in the upstream containment section of funnel 135a flows to a first part of suction piping (see, e.g., FIG. 3B). At step B6, the brine continues progression through a second part of the suction piping. At step B7, the brine moves through a third part of the suction piping. At step B8, the brine encounters the pumps (e.g., 165a-165e of FIGS. 3A and 3B) and may be discharged to a brine containment area. Each of the pumps (e.g., 165a-165e of FIGS. 3A and 3B) may be configured to pump both freshwater and saltwater simultaneously, as described in more detail below.

Figure 3A:
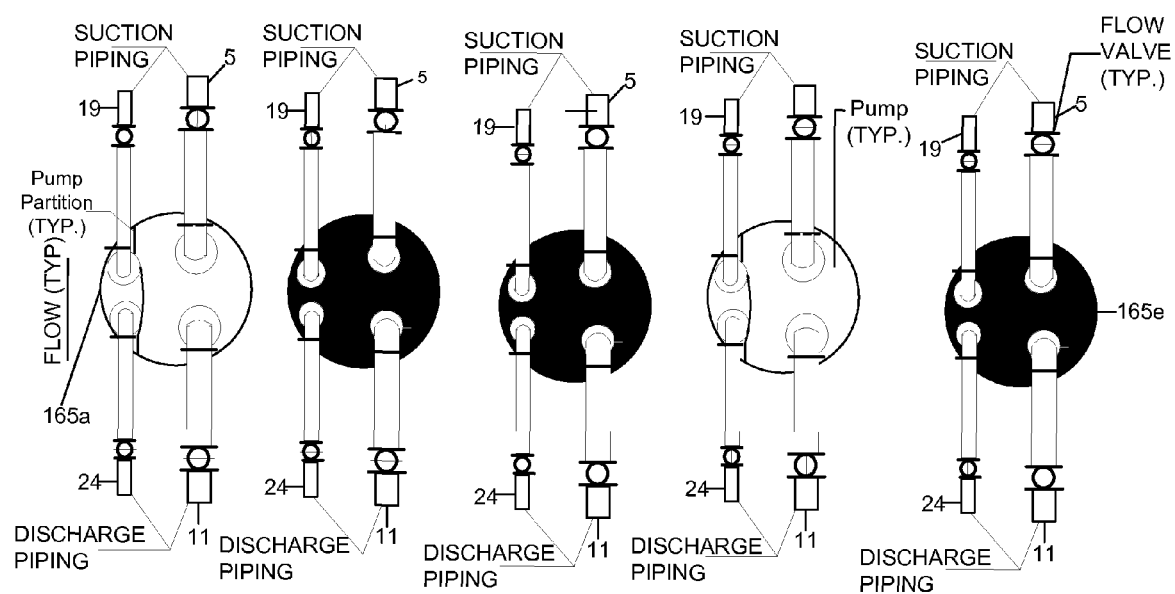
FIG. 3A shows a sequential, top-down view of an example of a plurality of hydraulic desalination pump devices of a pump system, configured according to the principles of the invention.
Figure 3B:
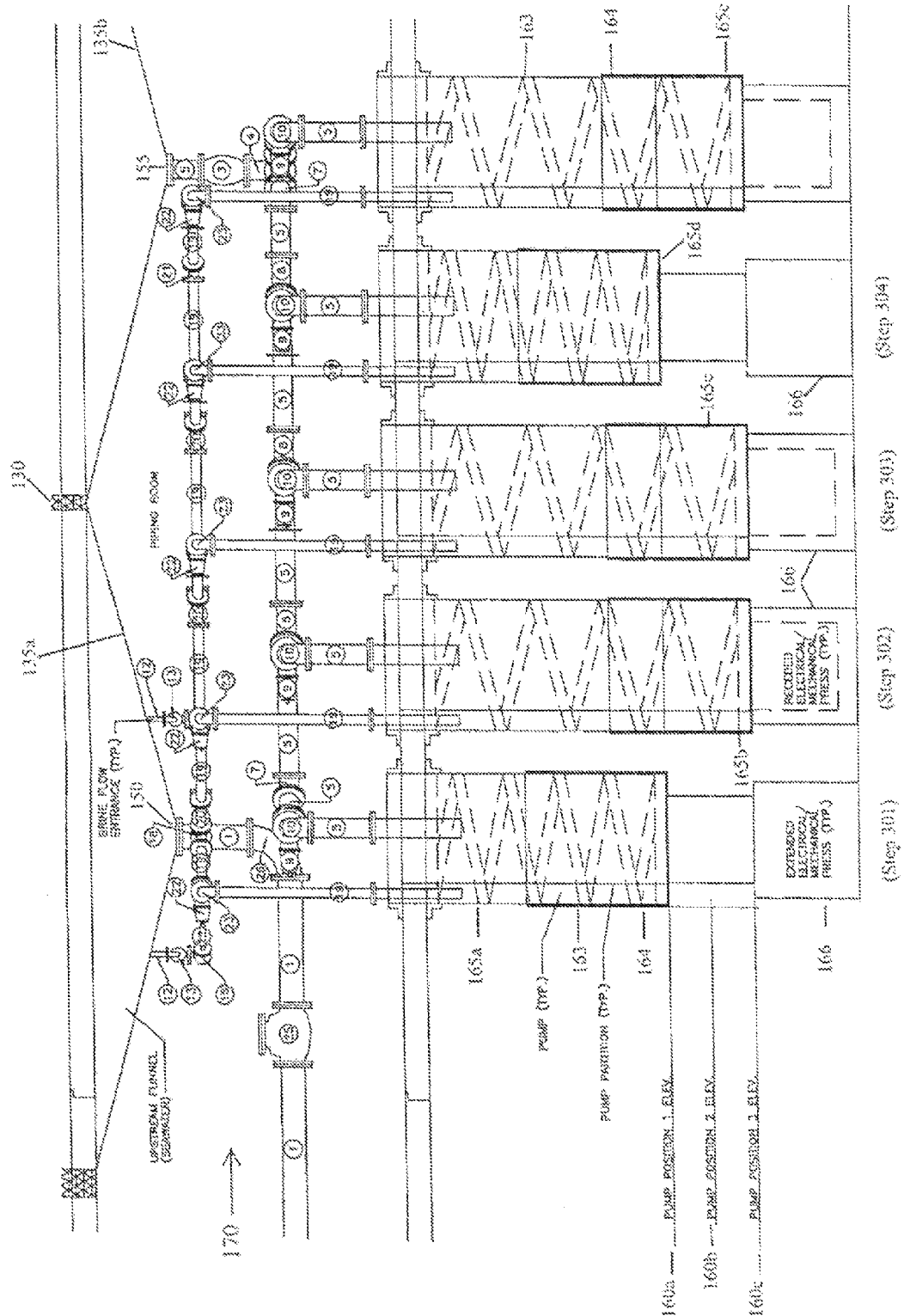
FIG. 3B shows a side cross-sectional view of the plurality of hydraulic desalination pump devices of FIG. 3A, and also shows an example of a sequence of operation thereof, and exemplary valves and piping that may be used for connecting to the funnels of the components shown in FIG. 2.

FIGS. 2A and 2B show more detailed views of certain components that may be included in the configurations of FIGS. 1A and 1B. As shown, a pump station 115 is configured to include a water vaporization tank 120 shown as an enclosing curved structure to encompass a vapor space 122, a plurality of funnels 135a and 135b separated by a partition 130, and one or more heat conduits 140 coupled to a heat source 145 and to vaporization tank 120 to permit heating of the interior of the vaporization tank 120. The partition 130 may be configured to separate the saltwater (shown on the left)

from the freshwater (shown on the right) that is produced and captured by the desalination process described herein. A tank cap 160 permits access to the vaporization tank such as, for example, for use in evacuation of the vaporization tank 120, or cleaning of the vaporization tank 120. Funnel 135a comprises a saltwater retaining structure and is configured with a force main pipe connector 150 for connecting the force main pipe 1 (FIG. 3B), and also configured to couple to and receive suction pipe 12 (FIG. 3B). Funnel 135b comprises a freshwater retaining structure and may be configured with a suction pipe connector 155 that may connect to suction pipe 5 (FIGS. 3A and 3B). The vaporization tank 120 may comprise a containment vessel that may be configured to substantially enclose an upstream containment section and a downstream containment section, and may contain water vapor for condensation, as explained more fully below. As shown in FIG. 2B, the tank partition 130 may also be configured to house a heat exchanger 131 which may provide a thermal flow path from the freshwater downstream side to the seawater upstream side for heat released during condensation.

FIG. 3A shows a sequential, top-down view of an example of a plurality of hydraulic desalination pump devices of a pump system, configured according to the principles of the invention. FIG. 3B shows a side cross-sectional view of the plurality of hydraulic desalination pump devices of FIG. 3A, as well as an exemplary sequence of operation thereof, and exemplary valves and piping for connecting to the funnels 135a, 135b of FIGS. 2A and 2B.

Table 1 provides a cross-reference of examples of certain various components that may be included with the plurality of hydraulic desalination pump devices of FIGS. 3A and 3B, showing reference numbers (1-28), exemplary quantity (which may vary depending on specific application), and illustrative description of the components.

TABLE 1

Pipe Schedule for Constant Flow - 1,200 GPM Station

| Ref. # | Quant. | Component and/or Function |
|---|---|---|
| 1 | 4 | 10" Force Main Pipe (Seawater, Assume 3.5% Salinity) |
| 2 | 1 | 10" Gate Valve |
| 3 | 1 | 8" Set Friction Valve |
| 4 | 1 | 8" Long Radius 90' Bend |
| 5 | 22 | 8" Suction Pipe (Freshwater & Air Source) |
| 6 | 1 | 8" True Wye |
| 7 | 7 | 8" 45' Bend |
| 8 | 3 | 8" WYE |
| 9 | 10 | 8" Flow Valve |
| 10 | 10 | 8" 90' Bend |
| 11 | 15 | 8" Discharge Pipe (Freshwater & Air, Approx. 0% Salinity) to freshwater storage |
| 12 | 10 | 2" Suction Pipe (Brine, Approx. 35% Salinity) |
| 13 | 6 | 2" 90' Bend |
| 14 | 2 | 2" Tee |
| 15 | 2 | 2" 45' Bend |
| 16 | 2 | 3" × 2" Concentric Reducer |
| 17 | 1 | 3" × 3" × 4" True WYE |
| 18 | 1 | 4" True WYE |
| 19 | 23 | 4" Suction Pipe (Brine, Approx. 35% Salinity) |
| 20 | 3 | 4" WYE |
| 21 | 6 | 4" 45' Bend |
| 22 | 10 | 4" Flow Valve |
| 23 | 10 | 4"'90' Bend |
| 24 | 15 | 4" Discharge Pipe (Brine, Approx. 35% Salinity) |
| 25 | 1 | 10" Set Friction Valve |
| 26 | 1 | 10" Long Radius 90' Bend |
| 27 | 1-5 | Discharge piping for Brine to brine storage |
| 28 | 1-5 | Discharge piping for Freshwater |

The hydraulic desalination pump devices 165a-165e may function as the prime movers of water for the hydraulic desalination system and process described herein. According to the principles of the invention, the hydraulic desalination system and process may involve use of hydraulic desalination pump devices 165a-165e, which may be spring-loaded pumps, in combination with valves and piping 170 (parts of the infrastructure), as shown in FIG. 3B, and an air nozzle, vaporization tank and other equipment as shown in FIGS. 1A and 1B. These elements combine to create a thermodynamic siphon, an example of which is shown in FIG. 5, which effectively bypasses the normally prohibitive heat of vaporization step associated with traditional desalination processes, thereby greatly reducing overall energy requirements.

Figure 8:
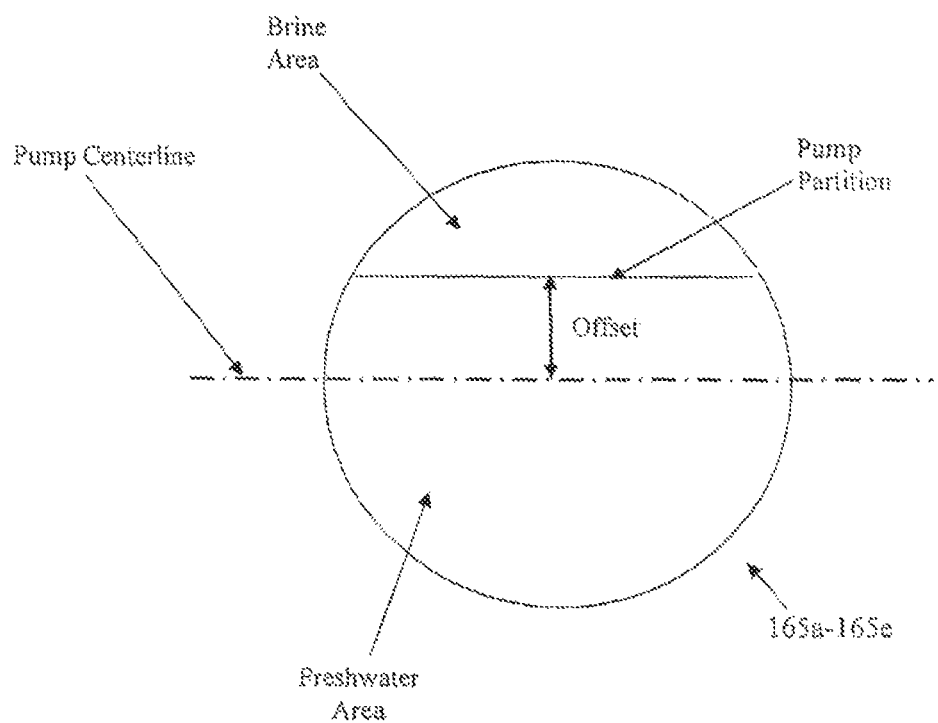
FIG. 8 shows a top-down view of an example of a hydraulic desalination pump, according to the principles of the invention.

Each of hydraulic desalination pump devices 165a-165e has a simple configuration that is generally free of the intricate internal components, small tubing, and narrow passageways that cause the large friction losses within traditional pumps. The configuration may include a relatively large, cylindrical pump cavity 164 that may be expanded by a compression spring 163 of similar diameter and/or similar circumference. As illustrated in FIG. 3A, each of the of hydraulic desalination pump devices 165a-165e may be configured with two pipe inlets (5 and 19) and two pipe outlets (11 and 24). All four pipe inlets and outlets may be positioned atop the respective hydraulic desalination pump devices 165a-165e. A single inlet (5) and outlet (11) pairing may be used for suction and discharge of a mixture of freshwater and air. Another inlet (19) and outlet (24) pairing may be used for suction and discharge of brine. The mixed flow of freshwater and air is kept separate from the brine flow by a partition within the pump cavity 164 (and spring). The pump partition, for example, as illustrated in FIG. 8, may be positioned such that approximately 90% of flow drawn by the respective hydraulic desalination pump devices 165a-165e includes the mixed flow of freshwater and air, while the remaining approximate 10% includes brine. This ratio may maximize the efficiency of desalinating typical seawater or other saltwater source while still maintaining salt in solution in the brine. Other ratios and partition positions can be selected, if necessary, to accommodate different saltwater salinities or smaller desalination units.

FIG. 3B also illustrates the sequence of operation of the of hydraulic desalination pump devices 165a-165e, according to the principles of the invention. As the flows enter the of hydraulic desalination pump devices 165a-165e, the spring 163 causes the pump cavity 164 to expand downwards at a relatively slow rate. When expansion of the pump cavity 164 is complete (to about its fullest extent), an electro-mechanical press 166 (or other similar powered press mechanism) at the bottom of the pump may be activated to begin compressing the cavity to its original non-expanded position. During compression, brine and freshwater/air are discharged through their outlets (11 and 24) and sent to respective storage areas. A more detailed description of the operation of the hydraulic desalination pump devices 165a-165d is provided next.

Each of the four operating hydraulic desalination pump devices 165a-165d may operationally rotate rhythmically, but asynchronously, through the steps shown below in TABLE 2 which also shows the operation of flow valves in relation to the operation of the hydraulic desalination pump devices 165a-165d. ("Pump position 1" corresponds to 160a; "pump position 2" corresponds to 160b; and "pump position 3" corresponds to 160c as shown in FIG. 3B).

TABLE 2

| Step 1 (& sub-steps) | Step 2 (& sub-steps) | Step 3 (& sub-steps) | Step 4 (& sub-steps) |
|---|---|---|---|
| 1-1. Flow valves on suction piping in fully-open position. | 2-1. Flow valves on suction piping in fully-open position. | 3-1. Flow valves on suction piping in fully-closed position. | 4-1. Flow valves on suction piping in fully-closed position. |
| 1-2. Spring in pump position 1 (pump cavity empty/not expanded). | 2-2. Spring in pump position 3 (pump cavity filled/expanded). | 3-2. Spring in pump position 3 (pump cavity filled/expanded). | 4-2. Spring in pump position 1 (pump cavity empty/not expanded). |
| 1-3. Flow valves on discharge piping in fully-closed position. | 2-3. Flow valves on discharge piping in fully-closed position. | 3-3. Flow valves on discharge piping in fully-open position. | 4-3. Flow valves on discharge piping in fully-open position. |
| 1-4. Electrical/mechanical press in extended position, but power off to allow expansion. | 2-4. Electrical/mechanical press in receded position with power off as expansion ends. | 3-4. Electrical/mechanical press in receded position, but power on to start compression. | 4-4. Electrical/mechanical press in extended position with power on as compression ends. |

For a constant flow (small) unit, only two (2) operating pumps may be required Therefore, steps P2, P3 and P4 may be treated as a single step since the transition from step P1 to step P2 for a small unit configuration may take a relatively long time to occur.

Continuous flow is typically needed in order to prolong the desalination process; otherwise, vaporization may cease while a hydraulic desalination pump device is discharging water. As illustrated in FIG. 3B, to maintain continuous flow, a plurality (e.g. two, three, four or five) of the hydraulic desalination pump devices may be installed in parallel, with flow valves (e.g., flow valve 22) attached to each pump's suction and/or discharge lines. The hydraulic desalination pump devices 165a-165d may operate rhythmically such that only one hydraulic pump at a time draws flow. One of the hydraulic desalination pump devices may serve as a redundant spare pump 165e. In the event of a failure to one of the other operating pump devices, the spare pump device 165e can be started and continuous flow maintained.

All of the hydraulic desalination pump devices 165a-165e have a specific characteristic or relationship with regards to their ability to deliver flow rates and exert pressure (or head). But, in general, a pump exerts more pressure to the surroundings when it is pumping fluid at a low flow rate. Conversely, a pump exerts less pressure to the surroundings when it is pumping fluid at a high flow rate. This relationship exists within the pump device itself, regardless of how the flow rate affects the surroundings, and is known as a pump curve. A typical pump curve is shown in FIG. 6.

A traditional pump has internal mechanisms, tubing, passageways, etc. that are so affected by flow rate within the pump that the pump's ability to exert pressure on its surroundings diminishes as the flow rate increases. This diminished capacity is due to friction losses within the pump as the flow rate and, more importantly, flow velocities increase within the pump. Friction losses are heavily dependent upon flow velocities, and a small increase in flow velocity can result in a comparatively much larger increase in friction loss.

Eventually, as flow rates increase within a pump, a point will be reached at which the pump can no longer function properly. That point is when the Net Positive Suction Head Required (NPSHR) by the pump equals or surpasses the Net Positive Suction Head Available (NPSHA). NPSHR is related to the friction losses within the pump discussed previously, and it increases as flow rate through the pump increases. This direct relationship is called an NPSHR curve. FIG. 6 also shows a typical NPSHR curve. The NPSHA is basically the sum pressure supplied by the surroundings on the suction side of the pump. Technically, a pump cannot pull a fluid. Some pressure must be present on the suction side to push the fluid into the pump. By definition, that pressure, NPSHA, is the ambient atmospheric pressure, plus pressure from the height above the pump of the suction-side fluid source, minus friction losses from fluid flow in the external suction piping (NPSHA=atmosphere+fluid height−friction losses).

When the fluid is a liquid and NPSHR equals NPSHA, vaporization occurs. Friction losses within the pump may lower the pressure of the liquid so low that vapor bubbles may form in the liquid. Essentially, a form of boiling takes place. This boiling is termed cavitation, and, under normal circumstances, it may be a problem for pumps. First, cavitation reduces the flow of liquid delivered by the pump because it has to pump a mixture of liquid and vapor, not just liquid as intended. Second, the vapor bubbles may cause damage to the pump by repeatedly expanding and bursting against the pump's internal components. For these reasons, engineers try to avoid situations where a pump's NPSHR equals or exceeds NPSHA.

In the proper environment, however, using friction losses to purposefully cause vaporization may be beneficial. It could even be ideal for desalination, as vaporization occurs at ambient temperature and pressure, which means energy requirements should be relatively low. Accordingly, such a desalination process has great potential to be cost effective. The present invention takes advantage of this potential for providing hydraulic desalination.

Hydraulic desalination, according to principles of the present disclosure, takes advantage of a pump's ability to cause vaporization when friction losses equal or exceed NPSHA. However, vaporization within any pump may be problematic, particularly for traditional pumps. Vaporization (cavitation) may also occur within the suction piping external to the pump if friction losses within the piping match or exceed the NPSHA. However, vaporization in piping is not recommended either, as expansion and bursting of vapor bubbles within the limited confines of pipes cause damage to pipe walls similar to the damage caused to the internal components of pumps.

To safely exploit vaporization on the suction side of pumps, a hydraulic desalination process and system, according to the principles of the invention include, but are not limited to, the following equipment and features:

Hydraulic desalination pump devices that draw water through piping at a desired flowrate and velocity (e.g. between 2 and 8 feet-per-second or fps) while handling both brine (concentrated seawater) flow and a mixed flow of freshwater/air;

Friction valves that control friction on the suction side of hydraulic desalination pump devices and cause vaporization within vaporization tank;

A funnel upstream of the vaporization tank that provides transition between relatively small diameter force main piping and larger diameter vaporization tank, and provides openings from which brine may be drawn;

A vaporization tank where boiling can take place with minimal damage to surroundings;

A partition wall that houses a heat exchanger and divides the vaporization tank into seawater on the upstream side and freshwater on the downstream side;

A funnel downstream of the vaporization tank that provides transition between the larger diameter vaporization tank and the smaller diameter suction piping;

An air nozzle that introduces air, forcing condensation on the downstream side of the tank while providing heat for vaporization on the upstream side.

Traditional pumps are very good at moving fluid from one location to another, but they are not very good at safely causing vaporization on a large scale. The hydraulic desalination pump devices (e.g., 165a-165e) configured according to the principles of the invention are designed specifically for hydraulic desalination on scales ranging from small (e.g. less than 10 gallons per minute or gpm) to large (e.g. greater than 1,000 gpm).

Generally, the hydraulic desalination pump devices 165a-165e are configured substantially free of the intricate internal components, small tubing, and narrow passageways that cause the large friction losses within traditional pumps. As previously described, this configuration generally includes a relatively large, cylindrical pump cavity 164 that may be expanded by a compression spring 163 of similar diameter. Each of the hydraulic desalination pump devices 165a-165e may have two inlets and two outlets, with all four pipes positioned atop of the hydraulic desalination pump device 165a-165e. As previously described in relation to FIG. 3A, one inlet and outlet pairing may be used for suction and discharge of a mixture of freshwater and air. The other inlet and outlet pairing may be used for suction and discharge of brine. The mixed flow of freshwater and air is kept separate from the brine flow by a partition within the pump cavity (and spring), as shown, e.g., in FIG. 8. The partition within the pump cavity, as shown in FIG. 8, may be positioned such that approximately 90% of flow drawn by the pump includes the mixed flow of freshwater and air, while the remaining 10% includes brine. That ratio maximizes the efficiency of desalinating typical seawater while still maintaining salt in solution in the brine. Other ratios and partition positions can be selected, if necessary, to accommodate different saltwater salinities or smaller desalination units at the expense of efficiency. As the flows enter the hydraulic desalination pump device 165a-165e, the spring 163 may cause the pump cavity 164 to expand downwards at a relatively slow rate. When expansion is complete, an electrical/mechanical press at the bottom of each of the hydraulic desalination pump devices 165a-165e may be activated and may begin compressing the cavity to its original position. During compression, brine and freshwater/air are discharged through their outlets and sent to respective storage areas.

Generally, continuous flow of water is needed in order to prolong the desalination process; otherwise, vaporization may cease while the hydraulic desalination pump device 165a-165e is discharging water. To maintain continuous flow, a plurality (e.g., 2-5, or more) of spring-loaded hydraulic desalination pump devices 165a-165e may be installed in parallel, with flow valves attached to each pump device's suction and discharge lines. The hydraulic desalination pump devices 165a-165e operate rhythmically such that only one hydraulic desalination pump device 165a-165e at a time draws flow. One of the pumps (e.g., 165e) may serve as the redundant spare pump. In the event of a failure to one of the other operating pumps, the spare pump may be started and continuous flow can be maintained.

A residual benefit of the hydraulic desalination pump device's 165a-165e simple design is that mixtures of air and water should not adversely affect the pump's ability to function. Traditional pumps that are intended to pump either liquids or gases often deal poorly with the differing velocities and densities associated with liquid-gas mixtures. Flow velocities within spring-loaded pumps should be too low to cause any serious problems, despite the differing densities.

Dimensions and sizing for the compression spring may be governed by some general guidelines for springs, as well as the time it takes for the flow valves associated with the pumps to open and close. These guidelines may include:

The free spring length (length of spring (i.e., spring 163) when no forces are acting upon it) should be no more than, e.g., 10 times the overall diameter of the spring;

The operating range of compression should be somewhere between, e.g., about 80% of the maximum compression (fully compressed length of spring minus free spring length) and, e.g., about 20% of the maximum compression;

Wire diameter of the spring (i.e., spring 163) should be no less than, e.g., about 1/12th the overall spring diameter; and The spring's expansion volume must be large enough to allow at least, e.g., about 15 seconds to elapse between the start and end of expansion, giving the pump's flow valves adequate time to open and close.

Additionally, the force required to cause expansion of the spring 163 is a simple linear equation $F=kx$; where F is the force required to cause expansion of the spring, k is a constant based largely on the spring's material properties, and x is the length of expansion. This simple linear relationship facilitates sizing of the spring 163, and thereby helps ensure that the resulting hydraulic desalination principles produce freshwater at the desired rate.

By design, spring-loaded pumps (i.e., the hydraulic desalination pump device 165a-165e) have pump curves and NPSHR curves that are independent of the flowrate through the pump. Because spring-loaded pumps have no intricate internal components, small tubing, or narrow passageways that cause the large friction losses, their pump curves and NPSHR curves are completely horizontal, as shown in relation to FIG. 7. The only factor that affects the pump's ability to exert head (or pressure) to the surroundings is the position of the spring's leading face during expansion. Once the fluid reaches the pump in liquid form, nothing within the pump can cause that liquid to cavitate. Hence, the NPSHR curve for spring-loaded pumps is not only completely horizontal, but it is equal to zero for virtually all flows. FIG. 7 shows an example pump curve and NPSHR curve for spring-loaded pumps, such as the hydraulic desalination pump device 165a-165e. The major benefit of having no NPSHR is that the pump is very safe and efficient to use in the low NPSHA environment of hydraulic desalination.

Figure 4:
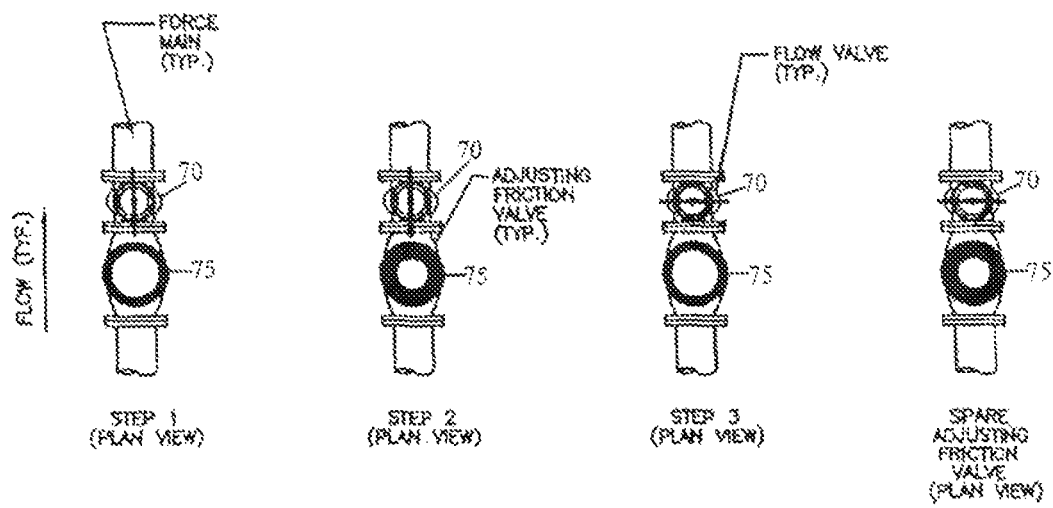
FIG. 4 shows a sequential, top-down view of an example of friction valves and flow valves that may be associated with the hydraulic desalination pump devices, configured according to the principles of the invention, and also shows an illustrative sequence of operation thereof.

FIG. 4 shows a sequential, top-down view of an example of the friction valves and flow valves associated with the hydraulic desalination pump devices, configured according to the principles of the invention, and also shows an illustrative sequence of operation thereof. Flow valves (e.g., flow valve 22, 70) may include valves that are configured to control flow entering and exiting the hydraulic desalination pump device 165a-165e. They also may control the flow exiting the adjusting friction valves (e.g., friction valve 25, 75). Flow valves can include, e.g., stop valves, stop-check valves, non-return check valves, pinch valves, or any other similarly functioning valve. Flow valves may be hydraulically or electrically actuated to operate in accordance with the pump sequence of operations (and adjusting friction valve sequence of operations).

Friction valves (e.g., friction valve 25, 75) include valves that are configured to restrict flow in piping upstream from the vaporization tank 120. The goal of using friction valves is to impart friction head on the saltwater flow such that vaporization occurs where desired in the vaporization tank 120. Friction valves 25, 75 may be either set or adjusting. Set friction valves are set to one partially-closed position that doesn't change during hydraulic desalination. Adjusting friction valves may be adjusted from partially-closed to more-fully closed positions during hydraulic desalination. Flow valves 22, 70 may be used in conjunction with adjusting friction valves to give the adjusting friction valves time to reset from the more-fully closed position to the partially-closed position. Like the hydraulic desalination pump devices 165a-165e, adjusting friction valves may operate rhythmically and in parallel to maintain continuous flow. The inclusion of at least one spare adjusting friction valve is suggested for redundancy in the event of failure by one or more of the other operating adjusting friction valves. Like flow valves 22, 70, and friction valves 25, 75, may be hydraulically or electrically actuated to operate in accordance with the corresponding adjusting friction valve sequence of operations. A valve, such as, e.g., a cycle stop valve (CSV) has the performance characteristics necessary to operate as either a set or adjusting friction valve in hydraulic desalination. Adjusting friction valve sequence of operations is explained in relation to FIG. 4, as described next.

In this example, the operation of friction valves includes the rhythmical, but asynchronous rotation, through the following steps of TABLE 3.

downstream side. The tank partition 130 may also be configured to house the heat exchanger 131 which may provide the flow path from the freshwater side to the seawater side for heat released during condensation. The vaporization tank 120 is typically the largest single piece of equipment in the hydraulic desalination process.

A certain level of non-condensable gases like oxygen and nitrogen may collect in the vaporization tank during hydraulic desalination. This level should remain constant and should not interfere significantly with the performance or efficiency of the desalination process. However, if the non-condensable gases in the vaporization tank do accumulate to an unacceptable level, vacuum pumps may be installed in the tank to discharge the excess non-condensable gases.

Two funnels 135a, 135b may be used in hydraulic desalination. One funnel 135a may be configured on the upstream side of the vaporization tank 120, and the other funnel 135b may be configured on the downstream side. Both funnels provide transitions between piping (where, by industry standard, liquid water flows at velocities ranging from, e.g., about 2 to about 8 fps) and the vaporization tank 120 (where water vapor flows at velocities up to, e.g., about 200 fps).

As seawater (assuming, e.g., about 3.5% salinity) evaporates into the vaporization tank 120, the water left behind becomes more concentrated with salt. This residual water with the higher salt content (e.g., approximately 35% salinity) is the brine. The upstream funnel also provides openings at its floor from which brine flow is drawn into brine suction piping that ultimately terminates at the hydraulic desalination pump device 165a-165e. The mixture of freshwater and air at the downstream funnel 135b have a salinity of approximately 0%.

The air nozzle is a small but an important part of hydraulic desalination. The air nozzle introduces air into the freshwater flow immediately after the downstream funnel. The important aspect of this step is that the air, although ambient, has a higher pressure and temperature than the water vapor in the vaporization tank. Ambient air pressure and temperature may

TABLE 3

| Step F1 & sub-steps | Step F2 & sub-steps | Step F3 & sub-steps |
| --- | --- | --- |
| F-1. Adjusting friction valve in partially-closed position. | F-1. Adjusting friction valve in more-fully closed position. | F-1. Adjusting friction valve in partially-closed position. |
| F-2. Downstream flow valve on force main in fully-open position. | F-2. Downstream flow valve on force main in fully-open position. | F-2. Downstream flow valve on force main in fully-closed position. |
| F-3. Adjusting friction valve undergoing this step does so synchronously with pump undergoing Step 1 of pump sequence of operations. (TABLE 2). | F-3. Adjusting friction valve undergoing this step does so synchronously with pump undergoing step 2 of pump sequence of operations (TABLE 2). | F-3. Adjusting friction valve undergoing this step does so synchronously with pumps undergoing steps 3 and 4 of pump sequence of operations (TABLE 2). |
| F-4. Flow through adjusting friction valve equals maximum flow (Step 1 of pump sequence of operations TABLE 2). | F-4. Flow through adjusting friction valve equals minimum flow (Step 2 of pump sequence of operations TABLE 2). | F-4. Flow through adjusting friction valve equals zero (steps 3 and 4 of pump sequence of operations of TABLE 2). |

As previously explained, the vaporization tank 120 is where vaporization can occur safely during the process of hydraulic desalination. The vaporization tank 120 may be sized to limit vapor flow velocities to below, e.g., about 200 feet-per-second (fps), which is generally accepted as the flow velocity limit for steam. The vaporization tank 120 may have a partition wall 130 through its centerline to separate the seawater on the upstream side from the freshwater on the be, e.g., about 14.7 psi and 72 degrees Fahrenheit, respectively. The pressure of the water vapor may be, e.g., approximately 0.3 psi, and its temperature may be, e.g., approximately 68 degrees Fahrenheit. It is noted that vaporization may be created strictly by lowering pressure through friction losses. No heat was added that would raise the temperature of the seawater/saltwater, which is generally considered to be approximately 68 degrees Fahrenheit, but may vary.

The importance of ambient air having higher pressure and temperature than the water vapor in the tank is two-fold:
- The higher pressure being applied by the introduced air will force the water vapor to condense into liquid freshwater; and
- The higher temperature of the introduced and surrounding air will force the heat released by the water vapor during condensation back into the vaporization tank towards the upstream side, where the heat is needed to complete vaporization.

This ability to achieve condensation and vaporization without adding pressure or heat from an external, beyond-ambient source is what gives hydraulic desalination such a distinct advantage over all other desalination processes. Through some iterative calculations, it was observed that introducing, e.g., approximately 2% air by volume to the water vapor consistently appeared to be an appropriate amount for establishing the liquid water level where desired on the downstream side of the vaporization tank.

Exemplary Overview of Hydraulic Desalination

Generally, Hydraulic Desalination involves a technique to lower the pressure of liquid saltwater to the vaporization point by generating flow through piping and appurtenances, capturing the vapor, condensing the vapor using higher pressure supplied by the ambient surroundings and recovering the heat released during condensation by maintaining ambient temperatures greater than vapor temperatures. Recovered heat may be used to enhance and perpetuate vaporization in a cyclical manner.

Exemplary Overview of Hydraulic Desalination Process

Hydraulic Desalination may transform saltwater into two end products: freshwater and brine. The steps provided below illustrate an exemplary chronological path of saltwater as it undergoes Hydraulic Desalination from start to finish and is transformed into the two end products.

Saltwater to Freshwater Chronological Path

For the saltwater to freshwater chronological path, the steps may include:
- Saltwater enters the force main and travels towards the desalination pump station 115. The first part of the force main runs from the saltwater source to the friction valve 25 in the station. By design, flow velocities in the force main should be kept between, e.g., about 2 and about 8 fps. The pressure within the saltwater is reduced due to friction loss caused by travelling through the force main.
- Once inside the station 115, saltwater passes through a set friction valve or adjusting friction valve, depending on whether the flow is constant or varying. The friction valve imparts head on the saltwater. After passing through the friction valve, the saltwater travels through the second part of the force main, which runs from the friction valve to the upstream funnel 135a. The pressure within the saltwater is reduced further due to friction loss caused by travelling through the friction valve and force main.
- Saltwater enters the upstream funnel 135a and travels upwards towards the vaporization tank 120. Movement upwards further lowers the pressure within the saltwater. The funnel 135a widens the cross-section of flow in preparation for the high velocities that occurs at vaporization.
- Saltwater enters the vaporization tank 120 and continues to travel upwards, which continues to lower the pressure within the saltwater. Eventually, the pressure is lowered to the point of vaporization.
- A percentage of the saltwater vaporizes, and the vapor 122 escapes upwards into the upper portion of the vaporization tank, crossing over the tank partition. By design, the flow velocities of the vapor 122 are kept below, e.g., about 200 fps. The tank partition 130 may comprise a wall through the center of the vaporization tank 120 that separates the liquid saltwater from the liquid freshwater. The wall does not extend to the top of the vaporization tank 120, allowing vapor to pass over it. The side of the tank partition where saltwater vaporizes is called the upstream side of the vaporization tank 120. The side of the tank partition where water vapor 122 is condensed to freshwater is called the downstream side of the vaporization tank.
- Due to the introduction of atmospheric air further downstream, condensation of the vapor 122 is forced below the top of the tank partition 130 on the downstream side of the vaporization tank 120. Freshwater travels downward towards the downstream funnel 135b.
- Freshwater enters the downstream funnel 135b and travels downwards towards the freshwater suction piping 5. The funnel 135b reduces the cross-section of flow to allow ideal flow velocities to occur within the downstream freshwater suction piping 5.
- Freshwater enters the suction piping 5 and travels towards the pump (e.g., 165a-165e). The freshwater suction piping includes a set friction valve 75 to provide operational flexibility in case it becomes necessary or desirable to impart head within the freshwater suction piping. By design, flow velocities in the suction piping should be kept between, e.g., about 2 and about 8 fps. The freshwater suction piping terminates at the hydraulic desalination pump device 165a-165e. Immediately upstream of the friction valve 75, for example, approximately 2% by volume of atmospheric air is introduced into the suction piping 5 to raise the pressure within the freshwater just enough to force condensation in the downstream side of the vaporization tank 120. The heat released by condensation may flow through the heat exchanger 131 to the upstream side of the vaporization tank 120, where it is used to promote vaporization. Heat loss to the environment may be substantially avoided by maintaining an ambient temperature outside the vaporization tank that's greater than the temperature of the enclosed water and vapor.
- Freshwater enters the hydraulic desalination pump device 165a-165e as the pump cavity 164 expands. When the pump cavity 164 is compressed, the freshwater exits the hydraulic desalination pump device 165a-165e and is directed to freshwater discharge piping 11. The discharge piping 11 takes the freshwater from the hydraulic desalination pump device 165a-165e to a storage area where the freshwater awaits further treatment or distribution. A wall, called a pump partition, within the pump cavity 164 separates freshwater and its corresponding freshwater piping from brine and its corresponding brine piping.

Saltwater to Brine Exemplary Chronological Path

For the saltwater to brine chronological path, the steps may include:
- Saltwater enters the force main 1 and travels towards the desalination pump station 115. The first part of the force main 1 runs from the saltwater source to the friction valve 25 in the station. By design, flow velocities in the force main 1 should be kept between, e.g., about 2 and about 8 fps. The pressure within the saltwater is reduced due to friction loss caused by travelling through the force main 1.

Once inside the station 115, saltwater passes through a set friction valve or adjusting friction valve 25, depending on whether the flow is constant or varying. The friction valve 25 imparts head on the saltwater. After passing through the friction valve 25, the saltwater travels through the second part of the force main, which runs from the friction valve 25 to the upstream funnel 135a. The pressure within the saltwater is reduced further due to friction loss caused by travelling through the friction valve and force main.

Saltwater enters the upstream funnel 135a and travels upwards towards the vaporization tank 120. Movement upwards further lowers the pressure within the saltwater. The funnel 135a widens the cross-section of flow in preparation for the high velocities that occurs at vaporization.

Saltwater enters the vaporization tank 120 and continues to travel upwards, which continues to lower the pressure within the saltwater. Eventually, the pressure is lowered to the point of vaporization.

A percentage of the saltwater does not vaporize, but is drawn downwards towards, e.g., four openings at the bottom of the upstream funnel 135a that are entrances to the brine suction piping 12. Brine is the remaining saltwater that has become more concentrated with salt and other compounds which are incapable of escaping with the vapor. This brine enters the first part of the brine suction piping 12, which starts at the bottom of the upstream funnel 135a and ends at a tee or true wye. If possible, the flow velocities of the brine in the first part of the suction piping should be kept between, e.g., about 2 and about 8 fps.

Brine enters the second part of the brine suction piping, which starts at a tee or true wye and ends at a true wye. The tee or true wye at the start of this suction piping is where two first part brine suction pipelines are merged. Flowrate in the second part of the brine suction piping is twice the flowrate in the first parts. By design, the flow velocities of the brine in the second part of the suction piping should be kept between, e.g., about 2 and about 8 fps.

Brine enters the third and final part of the brine suction piping, which starts at a true wye and terminates at the pump. The true wye at the start of this suction piping is where two second part brine suction pipelines are merged. Flowrate in the third and final part of the brine suction piping is twice the flowrate in the second parts. By design, the flow velocities of the brine in the third and final part of the suction piping should be kept between, e.g., about 2 and about 8 fps.

Brine enters the pump as the pump cavity expands. When the pump cavity 164 is compressed, the brine exits the hydraulic desalination pump device 165a-165e and is directed to brine discharge piping 24. The discharge piping 24 takes the brine from the hydraulic desalination pump device 165a-165e to a storage area where the brine awaits further treatment or is returned to the source water.

Hydraulic Desalination Operational Advantages

Hydraulic desalination according to the principles of the present disclosure is not subject to some of the other problems that plague traditional desalination processes. For instance, currently utilized thermal processes of present day desalination processes that rely on high temperatures often have problems with scaling, where salt comes out of solution and attaches to, clogs, or corrodes piping and equipment. Membrane-based technologies are also susceptible to scaling due to the very fine openings in the semi-permeable membranes. Even a small amount of scaling on these membranes will have a large negative impact on their performance. Pre-treatment is usually necessary for membrane-based technology to address issues with scaling and remove debris that can foul the membranes. Hydraulic desalination is not as prone to problems from scaling, as it does not operate at higher temperatures which promote scaling, and it does not have equipment that is highly sensitive to small amounts of scaling. Furthermore, unlike membrane-based processes, hydraulic desalination does not require special pre-treatment.

Energy Required for Desalination

Energy is required to cause evaporation/vaporization. Normally, that energy takes the form of heat. Traditional methods of evaporation start with adding heat to water to raise its temperature to the boiling point. Then more heat needs to be added to convert the water from liquid to vapor, a conversion that occurs at the same boiling point temperature. It is this added heat, called heat of vaporization, that makes thermal desalination processes so reliant on external energy. In fact, over 90% of the energy required to cause evaporation may be consumed during this last conversion step, after the boiling point temperature has already been reached. In contrast, hydraulic desalination described by the present disclosure effectively bypasses this last high-energy step by simulating another well-known hydraulic phenomenon—the siphon.

In a typical siphon, water flow is raised from an upstream tank or source over a vertical barrier, then back down to a downstream tank or sink that is lower than the upstream source. Despite the vertical barrier in between the source and the sink, the water flow in a typical siphon is sustained naturally and indefinitely without adding any external energy. The only real work that needs to be done for the siphon is in the preparation. To prepare or prime the typical siphon, the tube through which water flows first needs to be filled with water. This can be done away from the source and sink. Once filled, both ends of the tube are capped. One end of the tube is then placed in the upstream source and the other end is placed in the downstream sink. The tube's ends are then uncapped and, assuming virtually constant levels at the source and sink, flow proceeds naturally and indefinitely with no further energy required to sustain it, effectively bypassing the intermediate vertical barrier.

As illustrated in relation to FIG. 5, hydraulic desalination involves a type of siphon, a sort of thermodynamic siphon that simulates the typical siphon in many ways. In this thermodynamic siphon, energy is raised over the heat of vaporization, then back down to a much lower energy. The desalination process is sustained with just the energy supplied by the relatively low-powered, hydraulic desalination pump devices 165a-165e.

Like the typical siphon, the real work that needs to be done is in the preparation. To prepare or prime the thermodynamic siphon, the downstream air nozzle is shut off and the vaporization tank is filled with water. Then the tank 120 is isolated by shutting off the upstream gate valve. The heaters and hydraulic desalination pump device 165a-165e are then turned on to begin evacuation of the tank. Once the water level has been lowered to the desired elevation, the gate valve and the air nozzle are both opened. The heaters are then turned off, but the spring-loaded pumps are kept in operation. Hydraulic desalination proceeds naturally and indefinitely with no additional external heat or energy required to sustain the process.

When priming the thermodynamic siphon, the spring-loaded pumps may prove to be incapable of filling the vaporization tank. Pumps can't pull a liquid. Instead, the spring-loaded pumps use friction to lower the pressure on one side of flow, allowing atmospheric pressure to push the flow from the other side. If the vaporization tank is sufficiently tall, the atmospheric pressure will not be strong enough to push flow to the top of the tank. If this happens, submersible pumps can be placed in the seawater source, or a fire hydrant can be used, to push water to the top of the tank.

As previously described, the air nozzle is important to the success of hydraulic desalination. In essence, the air nozzle 174 is the thermodynamic siphon that drives hydraulic desalination. The air introduced at the air nozzle 174 forces condensation, and it also forces heat flow towards where vaporization is occurring. The air forces these events because, although ambient, it has a higher pressure and temperature than the water vapor. When impacted by air entering the air nozzle 174, the water vapor has no alternative but to condense and release heat towards the path of least resistance, which is the heat flow path through the heat exchanger 131 to the upstream side of the tank 120 where vaporization is taking place. It is important to note that the heat released during condensation, called the heat of condensation, is equal in magnitude to the heat of vaporization. Recycling heat in this manner means the barrier, heat of vaporization, is effectively bypassed during hydraulic desalination.

Due to the thermodynamic siphon effect of hydraulic desalination, the heaters 145 should only be needed during initial evacuation. However, if necessary, the heaters 145 could be used to heat the ambient surroundings to ensure that the ambient air maintains a higher temperature than the water vapor 122 in the tank. Otherwise, low ambient air temperatures may result in heat loss to the ambient surroundings during condensation and reduced efficiency of the hydraulic desalination process.

Energy Grade Line

The energy grade line is what is used to calculate the energy associated with fluid flow. The purpose of these calculations is to determine the operating point for the hydraulic desalination pump devices. The operating point is the point where the pump curve intersects with the system curve. The system curve, also called Total Dynamic Head (TDH) curve, is the resistance to flow that exists in the piping/equipment external to the hydraulic desalination pump devices. The operating point is normally described as a specific flowrate at a specific pressure or head. An example of operating points and system curves is shown in FIG. 6.

Minimum Energy for Separation

The minimum energy required to remove salt dissolved in water is generally accepted to be, e.g., approximately 0.7 kilowatt-hours per cubic meter (kWh/m3). This minimum energy is determined either from heat (enthalpy) of solution data for dissolved salt, or from the difference in equilibrium vapor pressures between seawater and freshwater. The heat of solution method for calculating the minimum energy applies to membrane-based technologies. The differing equilibrium vapor pressures method relates to the thermal desalination technologies. Hydraulic desalination is a form of thermal desalination, but unlike other forms of thermal desalination, it does not require a man-made compressor to condense seawater equilibrium vapor pressure to match freshwater equilibrium vapor pressure. That compression is done automatically by the higher-pressure atmospheric air introduced into the system. The air not only transforms the vapor into liquid water, but it also causes the necessary preliminary vapor compression. Because the vapor compression is done by the introduced ambient air, the corresponding, e.g., about 0.7 kWh/m$^3$ of energy does not need to be supplied. The only energy that needs to be supplied is for the pumps and valves, which is much less than 0.7 kWh/m$^3$. Therefore, the minimum energy requirement that is generally accepted for desalination does not apply to hydraulic desalination in the same way that it applies to other processes. Much like the way hydraulic desalination recycles the heat necessary for vaporization, the minimum energy required for separation is obtained from within the process itself.

Example Applications for Hydraulic Desalination

To show how hydraulic desalination can be applied to both small and large scale projects, four examples are described. They are as follows:
    Constant Flow—Spring-loaded pumps sized to draw, e.g., about 1,200 gpm at a constant rate;
    Constant Flow (small)—Spring-loaded pumps sized to draw, e.g., about 8 gpm at a constant rate;
    Varying Flows—Spring-loaded pumps sized to draw, e.g., about 1,200 gpm as an average; and
    Varying Flows (small)—Spring-loaded pumps sized to draw, e.g., about 8 gpm as an average.

Descriptions and comparisons of these four examples are presented below. None of the examples specifies material for piping or equipment; however, polyvinyl chloride (PVC), high-density polyethylene (HDPE), fiberglass, and various types of stainless steel (630 SS, AL6XN, Sea-Cure) are all known to be appropriate for use in seawater with salt water.

Constant Flow 1,200 gpm Station

This includes a built-on-site pump station. The footprint may be approximately 56 feet by 58 feet, and the overall vertical span may be approximately 67 feet. Of that vertical span, about 38 feet may be above ground (including an A-frame roof), and roughly 29 feet may be below ground.

The above ground structure may be a 1-story building with a 21-foot high ceiling, approximately. The vaporization tank 120, heaters 145 (for initial evacuation), and any control panels may reside in the above ground portion of the building 115. Staircases and hatches may be installed to provide access to the piping and pumps below ground.

The building 115 may include two levels below ground. The first level below ground may house the majority of the piping. The second level below ground may be where the pumps are located. Five pumps might be installed. Four pumps may operate together to maintain continuous flow, while the last pump may be available as a spare. Springs in the hydraulic desalination pump device may be 54 inches in diameter with a spring constant k (a measure of a spring's potential to expand) of 977 pounds per foot (lbs/ft), approximately. The hydraulic desalination pump devices may draw flow at a constant rate of, e.g., about 1,200 gpm.

The station 115 may be equipped with a gate valve 160 (for initial evacuation) and a set friction valve, both upstream from the vaporization tank 120. Although the station may have only one set friction valve, the seawater level in the vaporization tank will remain essentially constant along the 8-foot height of the tank partition as the pumps operate, due to the constant flow generated by the pumps.

About 90% of the total flow coming into the station may be converted to freshwater, which means that the station may produce freshwater at a rate of, e.g., about 1,080 gpm. Total power required by the station may be conservatively estimated to be, e.g., about 40 horsepower, or 30 kilowatts, to account for all power consumption. In actuality, it may require less power. The majority of the power may be used to drive or power the electrical/mechanical presses that compress the pump cavities and discharge flow. Remaining power consumption may be divided amongst the valves, control panel, lighting, and, if necessary, heating of ambient surroundings. The power-to-water ratio for this station may be determined to be, e.g., about 0.02 megawatts per million imperial gallons (MIGD), or about 0.005 megawatts per thousand cubic meters per day (MW/1,000 cubic meters per day).

Constant Flow (Small)

8 gpm Unit

This example includes a packaged unit that may be assembled before or after delivery to the site. The packaged unit includes outer walls that may include removable panels to allow access to the interior by personnel. The footprint may be approximately 11 feet by 14 feet, and the overall vertical span may be approximately 22 feet.

All of the vertical span may be above ground or atop a building floor/ship deck, and it may include, e.g., three levels. The vaporization tank and heaters (for initial evacuation) may reside in the top level. Most of the piping may be installed in the second level. The hydraulic desalination pump devices may be located in the bottom level, and the control switches may be located in the top level or second level to permit the controls to be at the eye level of most personnel. Three pumps may be installed. Two pumps may operate together to maintain continuous flow, while the last pump may be available as a spare. Springs in the pumps may be, e.g., about 42 inches in diameter with a spring constant k of, e.g., about 601 lbs/ft, approximately. The hydraulic desalination pump devices may draw flow at a constant rate of, e.g., about 8 gpm.

The unit may be equipped with a gate valve (for initial evacuation) and one set friction valve, both upstream from the vaporization tank 120. Although the unit may only have one set friction valve, the seawater level in the vaporization tank will remain essentially constant along the 2-foot height of the tank partition as the pumps operate, due to the constant flow generated by the pumps.

About 90% of the total flow coming into the unit may be converted to freshwater, which means the unit may produce freshwater at a rate of, e.g., about 7.2 gpm. Total power required by the unit is conservatively estimated to be, e.g., about 0.25 horsepower, or 0.19 kilowatts, to account for all power consumption. In actuality, it may require less power. The majority of the power may serve to drive or power the electrical/mechanical presses that compress the pump cavities and discharge flow. Remaining power consumption may be divided amongst the valves, control switches, lighting, and, if necessary, heating of ambient surroundings. The power-to-water ratio for this unit may be estimated to be, e.g., about 0.02 megawatts per million imperial gallons (MIGD), or about 0.005 megawatts per thousand cubic meters per day (MW/1,000 cubic meters per day).

Varying Flows 1,200 gpm Station

This example includes a built-on-site pump station. The footprint may be approximately 56 feet by 58 feet, and the overall vertical span may be approximately 63 feet. Of that vertical span, about 38 feet may be above ground (including an A-frame roof), and roughly 25 feet would be below ground.

The above ground structure may be a 1-story building with a 21-foot high ceiling, approximately. The vaporization tank 120, heaters 145 (for initial evacuation), and control panels may reside in the above ground portion of the building. Staircases and hatches may be installed to provide access to the piping and pumps below ground.

The building may include two levels below ground. The first level below ground may house the majority of the piping. The second level below ground may be where the pumps are located. Five pumps may be installed. Four pumps may operate together to maintain continuous flow, while the last pump may be available as a spare. Springs in the pumps may be, e.g., about 54 inches in diameter with a spring constant k of, e.g., about 3,520 lbs/ft, approximately. The pumps may draw flow at rates ranging from, e.g., about 994 to about 1,394 gpm, averaging, e.g., about 1,200 gpm overall.

The station may be equipped with a gate valve (for initial evacuation) and four adjusting friction valves, all upstream from the vaporization tank. Because the station has several adjusting friction valves operating in sequence, the seawater level in the vaporization tank may remain virtually unchanged along the 8-foot height of the tank partition as the pumps operate.

About 90% of the total flow coming into the station may be converted to freshwater, which means the station may produce freshwater at a rate of, e.g., about 1,080 gpm, approximately. Total power required by the station is conservatively estimated to be, e.g., about 40 horsepower, or 30 kilowatts, to account for all power consumption. In actuality, it may require less power. The majority of the power may serve to drive or power the electrical/mechanical presses that compress the pump cavities and discharge flow. Remaining power consumption may be divided amongst the valves, control panel, lighting, and, if necessary, heating of ambient surroundings. The power-to-water ratio for this station may be determined to be, e.g., about 0.02 megawatts per million imperial gallons (MIGD), or about 0.005 megawatts per thousand cubic meters per day (MW/1,000 cubic meters per day).

Varying Flows (Small)

8 gpm Unit

This example includes a packaged unit that could be assembled before or after delivery to the site. The packaged unit includes outer walls that may include removable panels to allow access to the interior by personnel. The footprint may be, e.g., approximately 7 feet by 7 feet, and the overall vertical span may be approximately 13 feet.

All of the vertical span may be above ground or atop a building floor/ship deck, and it would include three levels. The vaporization tank 120 and heaters 145 (for initial evacuation) may reside in the top level. Most of the piping may be installed in the second level. The control switches may also be located on the top or on the second level to permit the controls to be at the eye level of most personnel. The pumps may be located in the bottom level. Five pumps may be installed. Four pumps may operate together to maintain continuous flow, while the last pump may be available as a spare. Springs in the pumps may be, e.g., about 10 inches in diameter with a spring constant k of, e.g., about 211 lbs/ft. The pumps may draw flow at rates ranging from, e.g., about 6.93 to about 9.03 gpm, averaging, e.g., about 8 gpm overall.

The unit may be equipped with a gate valve (for initial evacuation) and four adjusting friction valves, all upstream from the vaporization tank 120. Because the unit has several adjusting friction valves operating in sequence, the seawater level in the vaporization tank may remain virtually unchanged along the 2-foot height of the tank partition as the pumps operate.

About 90% of the total flow coming into the unit may be converted to freshwater, which means the unit may produce freshwater at a rate of, e.g., about 7.2 gpm. Total power required by the unit may be conservatively estimated to be, e.g., about 0.25 horsepower, or 0.19 kilowatts, to account for all power consumption. In actuality, it may require less power. The majority of the power may serve to drive or power the electrical/mechanical presses that compress the pump cavities and discharge flow. Remaining power consumption may be divided amongst the valves, control switches, lighting, and, if necessary, heating of ambient surroundings. The power-to-water ratio for this unit may be determined to be, e.g., about 0.02 megawatts per million imperial gallons (MIGD), or about 0.005 megawatts per thousand cubic meters per day (MW/1,000 cubic meters per day).

Comparisons of Example Applications

Each of the above examples may have certain relative advantages and may have certain relative disadvantages. For the most part, the advantages and disadvantages may come down to size and complexity. The constant flow examples are larger than the varying flow examples; however, their size may be offset by their simpler design and operation. The constant flow examples may have only one set friction valve upstream from the vaporization tank instead of the four adjusting friction valves operating in sequence in the varying flows examples.

It is noted that more than one set friction valve may be used in the various examples described herein.

For the large-scale (about 1,200 gpm) examples, the difference in size is approximately 4 feet in vertical span. The constant flow, 1,200 gpm example has 67 feet in vertical span including 29 feet below ground, while the varying flows version has 63 feet of vertical span including 25 feet below ground, making the constant flow example about 16% deeper below ground than its varying flows counterpart.

For the small-scale (about 8 gpm) examples, the difference in size is quite significant in footprint and vertical span. The constant flow, 8 gpm example has a footprint of 11 feet by 14 feet, and a vertical span of 22 feet. The varying flows, 8 gpm example has a footprint of 7 feet by 7 feet, and a vertical span of 13 feet. This makes the constant flow example about 3 times as large in footprint (154 square feet vs. 49 square feet) and roughly 69% taller. This difference in size is more likely to be viewed as a compelling reason to use a variable flow configuration, even with the simpler design and operation of the constant flow counterpart.

Although other types of pumps currently in existence could theoretically be used in hydraulic desalination, the new spring-loaded pumps described herein have several distinct advantages. Some of the unique benefits that spring-loaded pumps provide may include the following:
Virtually no NPSHR;
Capable of handling mixture of liquid water and air;
Designed to handle both freshwater/air flow and brine flow simultaneously;
Design can be modified (by moving pump partition) to handle different seawater salinities or produce smaller but less efficient desalination units; and
Force required to expand springs is a simple linear equation that facilitates sizing of the spring and development of pump curves, thereby helping to ensure hydraulic desalination design produces freshwater at the desired rate (operating points).

Hydraulic desalination is an exciting, new process for desalinating water that appears to be at least 20 times more efficient than other desalination processes, and is viable for virtually all desired water production flowrates. It has been demonstrated to be feasible for small applications (less than 10 gpm) and large applications (more than 1,000 gpm) examples alike, with all applications benefitting from the thermodynamic siphon effect that drives hydraulic desalination. Unlike other processes, hydraulic desalination is not prone to scaling on its equipment, and special pre-treatment is not necessary to avoid scaling. Some equipment (e.g., valves, air nozzle) necessary for the operation of this new process is already in existence and use in other non-desalination industries. Other equipment (e.g., vaporization tank, funnels, heat exchanger) may be specifically constructed for hydraulic desalination, and the spring-loaded hydraulic desalination pump device 165*a*-165*e* may be a new product/device in its entirety.

While the invention has been described in terms of examples, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed is:

1. A method for hydraulic desalination of water, the method comprising the steps of:
vaporizing liquid saltwater by lowering the pressure of liquid saltwater using friction imparted by piping and accompanying infrastructure to a vaporization point by generating saltwater flow through the piping and the accompanying infrastructure to produce vapor;
capturing the vapor;
condensing the vapor to produce a continuous flow of freshwater by injecting air into the freshwater using higher pressure supplied by ambient surroundings;
recovering heat released during the condensation step by maintaining ambient temperatures greater than vapor temperatures; and
using the recovered heat to enhance and continue vaporization of the saltwater in a cyclical manner.

2. The method of claim 1, further comprising providing a vaporization tank configured with an upstream side to retain the saltwater and configured with a downstream side to retain the freshwater, the vaporization tank also configured to capture the vapor and to maintain ambient temperatures greater than the vapor temperatures.

3. The method of claim 2, further comprising the step of injecting air into the vaporization tank to force condensation on the downstream side of the vaporization tank for producing the freshwater while also providing heat for vaporization on the upstream side.

4. The method of claim 2, further comprising the step of pumping the saltwater to generate the saltwater flow through the piping and the accompanying infrastructure to the upstream side of the vaporization tank, while also pumping the freshwater from the downstream side of the vaporization tank to a storage area.

5. The method of claim 4, wherein the step of pumping comprises pumping both the saltwater and the freshwater simultaneously within at least one same pump.

6. The method of claim 4, wherein the step of pumping comprises pumping both the saltwater and the freshwater simultaneously within a plurality of spring-loaded pumps.

7. The method of claim 6, further comprising operating the plurality of spring-loaded pumps in rotation so that each of the plurality of pumps pump both the saltwater and the freshwater simultaneously to maintain a continuous flow of saltwater into the upstream side and a continuous flow of freshwater from the downstream side.

8. The method of claim 4, wherein the step of pumping has a draw flow ranging from about 994 gpm to about 1,394 gpm.

9. The method of claim 4, wherein the step of pumping comprises pumping both the saltwater and the freshwater simultaneously within a plurality of spring-loaded pumps wherein each of the plurality of spring-loaded pumps is configured with an expansion cavity that expands due to spring force.

10. The method of claim 4, wherein the step of pumping has a draw flow of about 1,200 gpm at a constant rate, about 8 gpm at a constant rate, about 1,200 gpm as an average, or about 8 gpm as an average.

11. The method of claim 1, wherein the step of condensing the vapor producing freshwater produces a constant flow up to about 1,080 gpm.

12. The method of claim 1, wherein the accompanying infrastructure in the step of vaporizing liquid saltwater by lowering the pressure of liquid saltwater to the vaporization point by generating saltwater flow through piping and accompanying infrastructure to produce vapor, includes at least one friction valve.

13. The method of claim 12, wherein the at least one friction valve comprises one of a set friction valve and at least one adjusting friction valve.

14. The method of claim 12, wherein the accompanying infrastructure includes at least one flow valve.

15. The method of claim 2, wherein the step of vaporizing liquid saltwater includes opening and closing a friction valve to control the saltwater flow to assist vaporizing the liquid saltwater.

16. The method of claim 1, wherein the step of condensing the vapor producing freshwater produces a constant flow of about 1,080 gpm.

* * * * *